Aug. 21, 1945.  M. RIDDIHOUGH  2,383,341
PLUG GAUGES
Filed Jan. 28, 1944
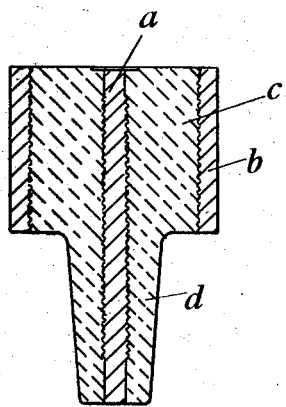
Inventor
M. Riddihough
By Attys Patented Aug. 21, 1945

2,383,341

UNITED STATES PATENT OFFICE 2,383,341

PLUG GAUGE

Maurice Riddihough, Birmingham, England, assignor to Deloro Smelting & Refining Company Limited, Birmingham, England Application January 28, 1944, Serial No. 520,091
In Great Britain June 7, 1943

1 Claim. (Cl. 33—178)

This invention relates to plain or screw threaded gauges of the plug type comprising a steel or other metal core and a sleeve of hard metal, the latter forming the measuring part of the gauge. The object of the invention is to enable the union of core and sleeve to be effected in a more convenient and satisfactory manner than heretofore.

The invention comprises a plug gauge having in combination with a metal core and a hard metal sleeve an intermediate uniting member made from resinoid or analogous plastic material.

The accompanying drawing is a sectional elevation of a plain plug gauge constructed in accordance with the invention.

In carrying the invention into effect as shown in the drawing, I employ a core $a$ made from steel or any other suitable metal, and a sleeve $b$ made from the alloy known by the registered trade-mark "Stellite" or any other analogous hard metal. The outer surface of the core $a$ and the inner surface of the sleeve $b$ may be roughened, splined, corrugated, or otherwise adapted to effect secure connection with an intermediate member $c$ employed for uniting the core and sleeve. The intermediate member $c$ is made from any convenient resinoid or analogous non-metallic plastic material which is adapted to be moulded under the action of heat and/or pressure, and which is hard in its final form.

In one manner of constructing the plug gauge above described, the core $a$ and sleeve $b$ are arranged in the required relative positions within any convenient mould, and the space between the core and sleeve is filled with the material required to form the uniting member $c$. The assembly is then heated and pressure is applied to the said material. Alternatively thermo-plastic material may be injected into the space between the core $a$ and sleeve $b$ to form the uniting member $c$. In either case the uniting member may be extended at one or each end beyond the sleeve $b$ and shaped to serve as a handle $d$, the length of the core being such that the core extends through the handle or each handle.

By the use of a resinoid or allied material I am able to effect the uniting of the core and sleeve in a more satisfactory maner than by the usual procedure involving the use of a thin layer of brazing material, and also effect economy in the metal required to form the sleeve.

Having thus described my invention what I claim as new and desire to secure by Letters Patent is:

A plug gauge having in combination with a metal core and a hard metal sleeve, an intermediate uniting member consisting of hard non-metallic material.

MAURICE RIDDIHOUGH.